United States Patent
Segal et al.

(10) Patent No.: US 11,188,613 B2
(45) Date of Patent: Nov. 30, 2021

(54) PROTECTING A SOCIAL MEDIA POST WITH A HASHTAG FROM DIVERGENCE

(71) Applicant: International Business Machines Corporation, Armonk, NY (US)

(72) Inventors: Benjamin P. Segal, Hyde Park, NY (US); James William Murdock, IV, Amawalk, NY (US); John Martin Prager, Raleigh, NC (US); Radha Mohan De, Howrah (IN); Sujoy Roy, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 52 days.

(21) Appl. No.: 16/701,953

(22) Filed: Dec. 3, 2019

(65) Prior Publication Data
US 2021/0165842 A1    Jun. 3, 2021

(51) Int. Cl.
| | |
|---|---|
| *G06F 16/958* | (2019.01) |
| *G06F 40/30* | (2020.01) |
| *H04L 12/58* | (2006.01) |
| *G06N 3/08* | (2006.01) |

(52) U.S. Cl.
CPC ............ *G06F 16/958* (2019.01); *G06F 40/30* (2020.01); *G06N 3/08* (2013.01); *H04L 51/12* (2013.01); *H04L 51/32* (2013.01)

(58) Field of Classification Search
CPC ......... G06F 16/958; G06F 40/30; G06N 3/08; H04L 51/12; H04L 51/32
See application file for complete search history.

(56) References Cited

U.S. PATENT DOCUMENTS

| | | |
|---|---|---|
| 9,959,503 B2 | 5/2018 | Vickrey et al. |
| 10,038,662 B2 | 7/2018 | Roy et al. |
| 10,079,792 B2 | 9/2018 | Anders et al. |

(Continued)

FOREIGN PATENT DOCUMENTS

KR          101713558 B1     3/2017

OTHER PUBLICATIONS

P. Mell et al., "The NIST Definition of Cloud Computing", National Institute of Standards and Technology, Information Technology Laboratory, Sep. 2011, pp. 1-7.

(Continued)

*Primary Examiner* — Kevin Ky
(74) *Attorney, Agent, or Firm* — Law Office of Jim Boice

(57) ABSTRACT

A method modifies a social media post in response to determining that a hashtag for the social media post diverges from how the hashtag is used by other social media posts. A computing device receives a social media post, which contains a hashtag, and analyzes the social media post using natural language processing and a sentiment analysis to determine a sense and sentiment of the social media post. The computing device receives a plurality of reference social media posts, where each of the reference social media posts contains the hashtag, and utilizes the natural language processing and the sentiment analysis to determine a sense and sentiment of the reference social media posts. In response to determining that the sense and sentiment of the social media post do not match the sense and sentiment of the reference social media posts, the computing device causes the social media post to be altered.

20 Claims, 6 Drawing Sheets

(56) References Cited

U.S. PATENT DOCUMENTS

| | | |
|---|---|---|
| 10,235,464 B2 | 3/2019 | Dhawan et al. |
| 2015/0310020 A1* | 10/2015 | Brav ................. G06F 40/30 707/730 |
| 2016/0117063 A1 | 4/2016 | Fuller |
| 2016/0269344 A1* | 9/2016 | Anders ............... H04L 51/32 |
| 2017/0052954 A1 | 2/2017 | State et al. |
| 2018/0203848 A1* | 7/2018 | Perez ................. G10L 25/30 |
| 2019/0245812 A1* | 8/2019 | Rico ................... A63F 13/87 |

OTHER PUBLICATIONS

Fajri Koto and Mirna Adriani, "HBE: Hashtag-Based Emotion Lexicons for Twitter Sentiment Analysis," Proceedings of the 7th Forum for Information Retrieval Evaluation (FIRE '15), Prasenjit Majumder, Mandar Mitra, Madhulika Agrawal, and Parth Mehta (Eds.). ACM, New York, NY, USA, 31-34.

Matt J. Kusner, et al. "From Word Embeddings To Document Distances", Proceedings of the 32nd International Conference On Machine Learning, Lille, France, 2015, JMLR: W&CP vol. 37 (2015).

* cited by examiner

PROTECTING A SOCIAL MEDIA POST WITH A HASHTAG FROM DIVERGENCE

BACKGROUND

The present invention relates to the field of social media posts that include one or more hashtags. Still more specifically, the present invention relates to the field of preventing a social media post from using a hashtag that is divergent from the sense and sentiment of the post.

SUMMARY

In one or more embodiments of the present invention, a method modifies a social media post in response to determining that a hashtag for the social media post diverges from how the hashtag is used by other social media posts. A computing device receives a social media post, which contains a hashtag, and analyzes the social media post using natural language processing to determine a sense of the social media post. The computing device uses a sentiment analysis to determine a sentiment of the social media post. The computing device receives a plurality of reference social media posts, where each of the plurality of social media posts contains the hashtag, and utilizes the natural language processing and the sentiment analysis to determine a sense and sentiment of the plurality of reference social media posts. The computing device determines that the sense and sentiment of the social media post do not match the sense and sentiment of the plurality of reference social media posts. In response to determining that the sense and sentiment of the social media post do not match the sense and sentiment of the plurality of reference social media posts, the computing device performs an action that causes the social media post to be altered.

In one or more embodiments of the present invention, altering the social media post is performed by cancelling the social media post, removing the hashtag from the social media post, amending text in the social media post, etc.

In one or more embodiments, the method(s) described herein are performed by an execution of a computer program product and/or a use of a computer system.

DETAILED DESCRIPTION

Figure 1:
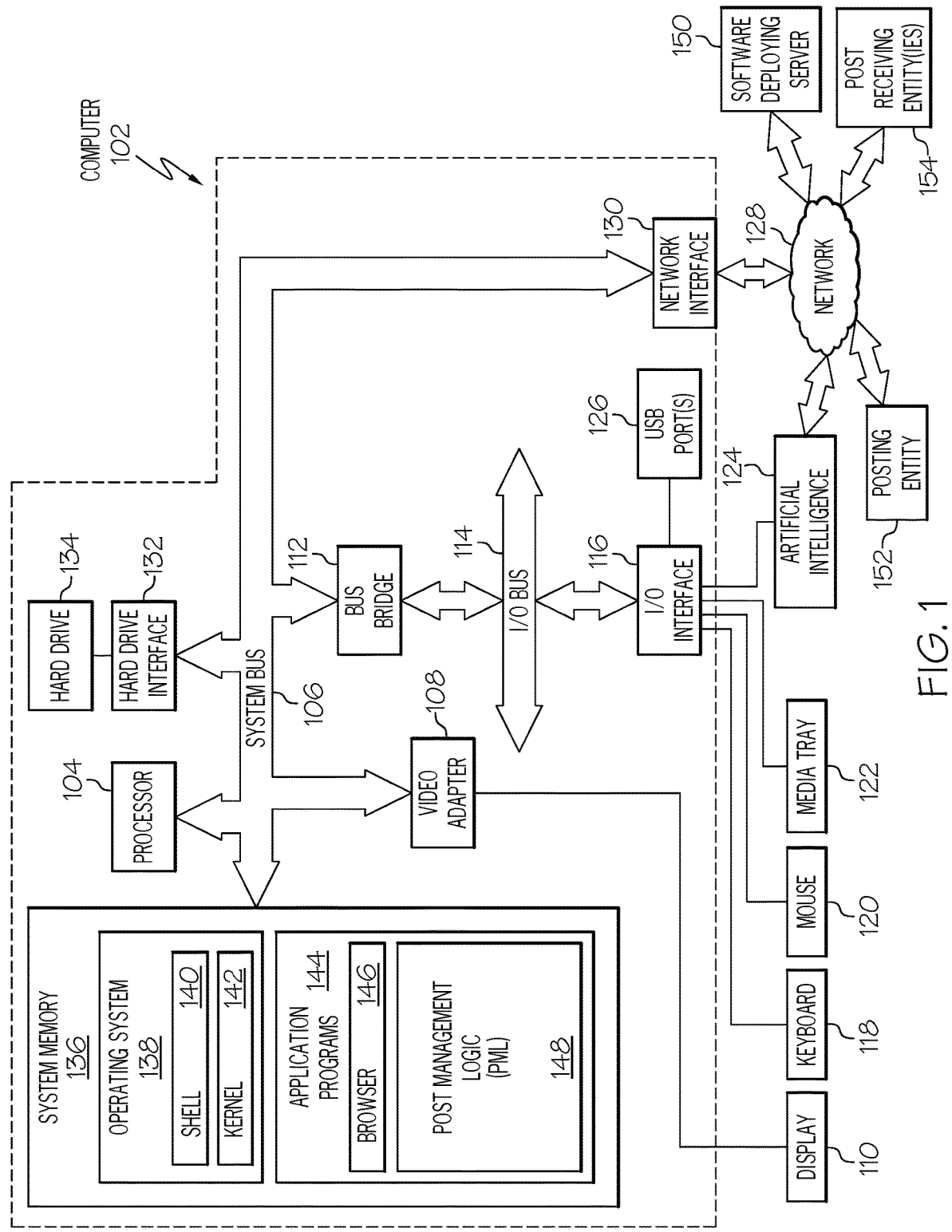
FIG. 1 depicts an exemplary system and network in which the present invention is implemented in various embodiments.

In one or more embodiments, the present invention is a system, a method, and/or a computer program product at any possible technical detail level of integration. In one or more embodiments, the computer program product includes a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

In one or more embodiments, computer readable program instructions for carrying out operations of the present invention comprise assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. In one or more embodiments, the computer readable program instructions execute entirely on the user's computer, partly on the user's computer, as a stand-alone software package, partly on the user's computer and partly on a remote computer or entirely on the remote computer or server. In the latter scenario and in one or more embodiments, the remote computer connected to the user's computer through any type of network, including a local area network (LAN) or a wide area network (WAN), or the connection is made to an external computer (for example, through the Internet using an Internet Service Provider). In some embodiments, electronic circuitry including, for example, programmable logic circuitry, field-programmable gate arrays (FPGA), or programmable logic arrays (PLA) execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

In one or more embodiments, these computer readable program instructions are provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. In one or more embodiments, these computer readable program instructions are also stored in a computer readable storage medium that, in one or more embodiments, direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

In one or more embodiments, the computer readable program instructions are also loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams represents a module, segment, or portion of instructions, which comprises one or more executable instructions for implementing the specified logical function(s). In some alternative implementations, the functions noted in the block occur out of the order noted in the figures. For example, two blocks shown in succession are, in fact, executed substantially concurrently, or the blocks are sometimes executed in the reverse order, depending upon the functionality involved. It will also be noted that, in one or more embodiments of the present invention, each block of the block diagrams and/or flowchart illustration, and combinations of blocks in the block diagrams and/or flowchart illustration, are implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that is utilized by and/or in the implementation of one or more embodiments of the present invention. Note that some or all of the exemplary architecture, including both depicted hardware and software, shown for and within computer 102 can be utilized by artificial intelligence 124 and/or software deploying server 150 and/or posting entity 152 and/or post receiving entity(ies) 154 shown in FIG. 1, and/or one or more of the neurons/nodes shown in the deep neural network 224 depicted in FIG. 2, and/or one or more of the neurons/nodes shown in the deep neural network 424 depicted in FIG. 4.

Exemplary computer 102 includes a processor 104 that is coupled to a system bus 106. Processor 104 can utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which can include storage devices such as CD-ROM drives, multi-media interfaces, etc.), artificial intelligence 124, and external USB port(s) 126. While the format of the ports connected to I/O interface 116 can be any known to those skilled in the art of computer architecture, in one or more embodiments some or all of these ports are universal serial bus (USB) ports.

As depicted, computer 102 is also able to communicate with artificial intelligence 124 and/or software deploying server 150 and/or posting entity 152 and/or post receiving entity(ies) 154 using a network interface 130 to a network 128. Network interface 130 is a hardware network interface, such as a network interface card (NIC), etc. Network 128 can be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include a Post Management Logic (PML) 148. PML 148 includes code for implementing the processes described below, including those described in FIGS. 2-4. In one embodiment, computer 102 is able to download PML 148 from software deploying server 150, including in an on-demand basis, wherein the code in PML 148 is not downloaded until needed for execution. Note further that, in one or more embodiments of the present invention, software deploying server 150 performs all of the functions associated with the present invention (including execution of PML 148), thus freeing computer 102 from having to use its own internal computing resources to execute PML 148.

In one or more embodiments of the present invention, computer 102 and posting entity 152 are a same computer, such that computer 102/posting entity 152 self-monitors its use of hashtags on social media posts.

In one or more embodiments of the present invention, computer 102 and posting entity 152 are different computers, such that computer 102 controls what posts are issued by posting entity 152, thereby improving the operation of posting entity 152 by limiting what posts are actually issued, thus limiting the bandwidth consumption of network 128. That is, in one or more embodiments of the present invention in which 102 directs posting entity 152 to delete any posts that have an inappropriate hashtag (based on the hashtag used and the sense of the post), then posting entity 152 becomes more efficient by consuming less bandwidth in communicating with post receiving entity(ies) 154.

Note that the hardware elements depicted in computer 102 are not intended to be exhaustive, but rather are representative to highlight essential components required by the present invention. For instance, computer 102 can include alternate memory storage devices such as magnetic cassettes, digital versatile disks (DVDs), Bernoulli cartridges, and the like. These and other variations are intended to be within the spirit and scope of the present invention.

As used herein, the term "sense" is defined as a meaning of a particular text, including but not limited to a post on social media.

As used herein, the term "sentiment" is defined as a particular emotion that is evoked by a particular text and/or a hashtag that is associated with that particular text.

As used herein, the term "hashtag" is defined as an identifier that is used to locate a text (e.g., a post on social media). When used in the context of a social media post, the term "hashtag" means a combination of a hash mark (#) along with a key word (e.g., "Name"), that together make up the hashtag (e.g., #Name) to identify a particular topic, person, date, etc.

The term "post" is defined as a message that is broadcast from one or more users of a social media service to other users of the social media service. The terms "post" and "social media post" are used interchangeably herein.

Thus, people write posts on social media. Posts often include hashtags, which identify a specific topic. For example, the hashtag #Name identifies a particular topic, such as a particular person, a particular location, a particular type of equipment, a particular viewpoint, etc. After the post is posted, other members of the social media can find posts that are about Name by searching for a post that includes the hashtag #Name.

The person posting the post will often create his/her own hashtag for use with a post. However, in some cases, that hashtag is already in use and may have a meaning that is inconsistent with the intent, sense, and/or sentiment of the current post. Thus, including the hashtag in the current post can mislead potential readers of the post, cause the current post to be found in searches for which it is not relevant, and/or bring unwanted attention to the poster. This issue is particularly problematic if the existing tag is attached to content that is associated with a strong sentiment.

Thus, a particular post has a hashtag that is associated with posts that have a particular meaning (referred to herein as a sense), and which evoke a particular emotion (referred to herein as a sentiment).

For example, consider the following scenario. Assume that a social media poster (i.e., a person who is submitting a post on social media) has just eaten at a local restaurant called "Name". As such, that social media poster will post (i.e., broadcast on social media) the message "Name is a great restaurant! #Name".

However, Name might be a name of a person, place, viewpoint, etc. that is about something other than restaurant reviews, and/or is highly emotional. For example, if Name is the name of a particularly despicable character from history, then the hashtag #Name is likely to make readers assume, especially before reading the post, that the restaurant review is about that despicable character (sense), which can convey a negative feeling (sentiment).

As such, one or more embodiments of the present invention create an alert and/or alter the user's post if the hashtag in the user's post is inconsistent with (divergent from) how that hashtag is used in other posts, including widespread usage of that hashtag in the other posts to convey a different sense/meaning and/or sentiment/emotion than what is intended for the current post.

In one or more embodiments of the present invention, all known posts that contain a same hashtag, and/or the surrounding context for these known posts, are separated into clusters using text clustering algorithms. For example, and in one or more embodiments of the present invention, other posts are retrieved by searching for the hashtag that is being used in the user's current post. Once retrieved, a word vector for each of the other posts is generated. Word vectors that have similar values/ranges are then clustered together in a word graph, and are labeled as having a certain sense. In one or more embodiments of the present invention, natural language processing identifies the types of words in the post (i.e., classifies the words and/or their context). Such similar posts are then labeled with a label that describes the sense of the similar posts.

Thus, the hashtag that is used by all of these similar posts in a cluster correspond to a single sense of that cluster.

In one or more embodiments of the present invention, for each cluster, one or more prototypical posts are selected from that cluster. That is, if the cluster is of posts that are all related to a particular sense, then one of the posts from the cluster (e.g., "Location Name is a wonderful vacation spot! #Name") is used as a prototypical post for that cluster. A sentiment analysis is then performed on one or more prototypical posts (preferably a single prototypical post) from the cluster in order to identify the sentiment of all posts in that cluster.

Thus, each cluster is associated with both a particular sense as well as a particular sentiment, including the sense/sentiment of the prototypical post from that cluster.

For example, assume that a first cluster's prototypical post is "Location Name is a wonderful vacation spot! #Name", while a second cluster's prototypical post "Person Name is an unusual artist. #Name". As such, each cluster (and/or its respective prototypical post) has a different sense (meaning), and may or may not evoke the same sentiment (emotion).

For each sense identified for the various clusters, the sentiment of these senses is determined.

That is, for each sense cluster identified above, a sentiment analysis (e.g., using context and/or term analysis) determines what type of emotion is evoked in a particular cluster's posts. This sentiment analysis can be coarse (e.g., identifies an overall positive and negative sentiment for the cluster as a whole), and/or can be more fine-grained (e.g., distinguishing angry from sad).

Thus, one or more embodiments of the present invention first determine whether the sense of a current post matches the sense of other posts that use the same hashtag as the current post, and then determine whether the sentiment of the current post and the other posts (i.e., the text of the current post and the other posts, and/or their shared hashtag) is consistent between the current post and the other posts.

For each common sense identified for the cluster(s) that use the hashtag found in the current post, one or more embodiments of the present invention first determines whether the sense of the current post is consistent with the sense of other posts that use that same particular hashtag.

For example, and in one or more embodiments of the present invention, a word vector for the current post is generated, and then compared to word vectors of other posts that use the same hashtag as the current post.

In one or more embodiments of the present invention, a word vector distance between the current post and one or more posts from the reference posts is calculated. That is, in a word vector analysis, a vector of words has a certain value, based on the words themselves and their positioning relative to one another. By comparing word vector values for different posts to one another, a rough determination is made as to whether the two posts are similar or divergent. Thus, in one or more embodiments of the present invention, a word vector analysis determines whether a sense of the current post matches the common sense in a particular cluster of posts (that use the same hashtag at the current post).

However, for a more accurate determination as to how similar the sense/meaning between current post and the other posts are, and/or how similar the sentiment/emotion between two posts are to one another, one or more embodiments of the present invention utilizes artificial intelligence, such as artificial intelligence 124 shown in FIG. 1.

Figure 2:
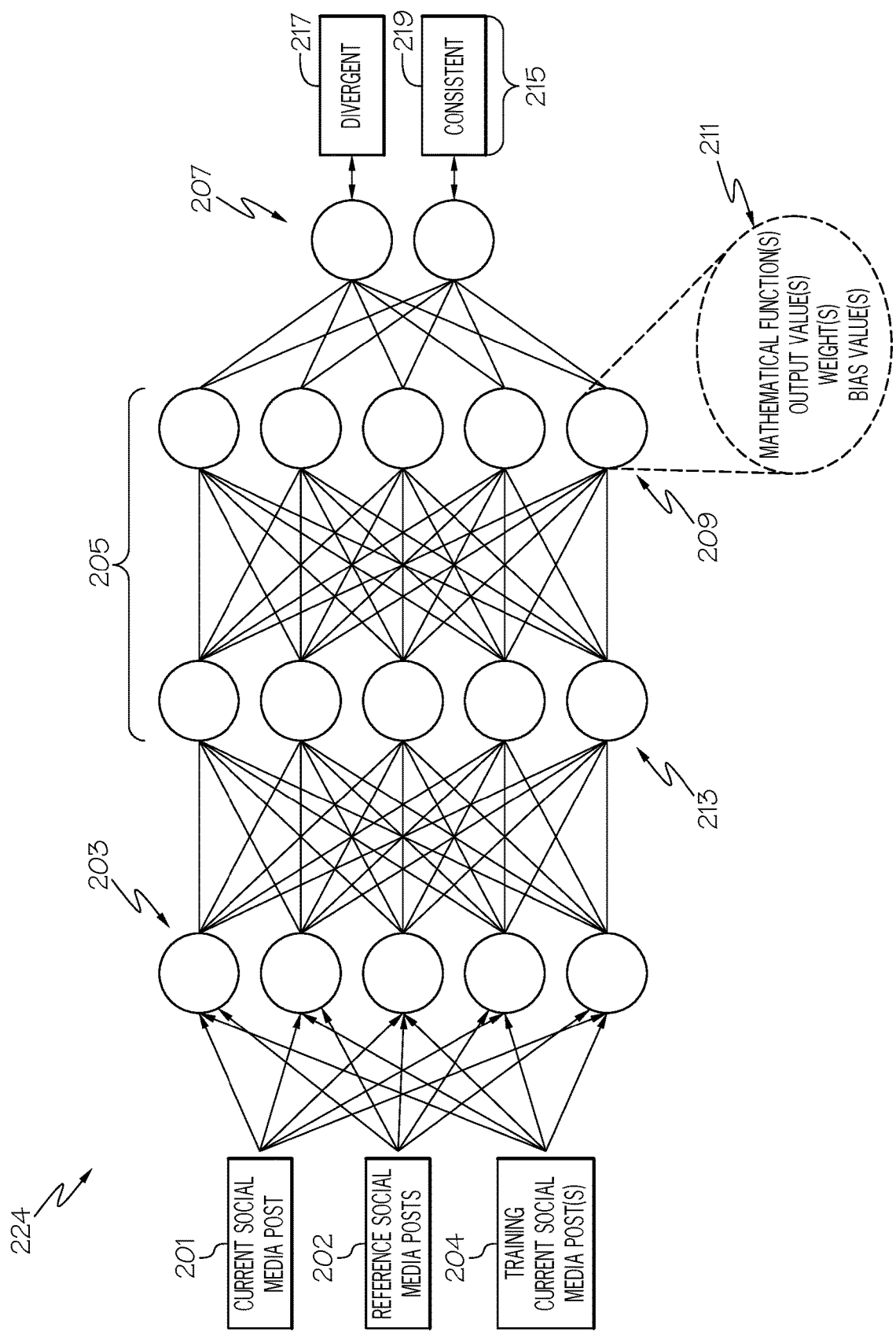
FIG. 2 illustrates an exemplary deep neural network as used in one or more embodiments of the present invention to determine if a sense of a current social media post is consistent with senses of other reference social media posts.

Thus, in one or more embodiments of the present invention, a trained deep neural network (DNN), such as the DNN 224 shown in FIG. 2 (analogous to artificial intelligence 124 shown in FIG. 1), compares the current social media post 201 to other reference social media posts 202 in order to determine if the sense/meaning of the current social media post and the reference social media posts are the same (consistent) or different (divergent). In one or more embodiments of the present invention, the current social media post 201 and posts from the other reference social media posts 202 use a same hashtag.

Logic units within DNN 224 are referred to as "neurons" or "nodes". If the electronic neural network is implemented entirely in software, then each neuron/node is a separate piece of code (i.e., instructions that perform certain actions). If the electronic neural network is implemented entirely in hardware, then each neuron/node is a separate piece of hardware logic (e.g., a processor, a gate array, etc.). If the electronic neural network is implemented as a combination of hardware and software, then each neuron/node is a set of instructions and/or a piece of hardware logic.

A neural network, as the name implies, is roughly modeled after a biological neural network (e.g., a human brain). A biological neural network is made up of a series of interconnected neurons, which affect one another. For example, a first neuron can be electrically connected by a synapse to a second neuron through the release of neurotransmitters (from the first neuron) which are received by the second neuron. These neurotransmitters can cause the second neuron to become excited or inhibited. A pattern of excited/inhibited interconnected neurons eventually lead to a biological result, including thoughts, muscle movement, memory retrieval, etc. While this description of a biological neural network is highly simplified, the high-level overview is that one or more biological neurons affect the operation of one or more other bio-electrically connected biological neurons.

An electronic neural network, as described herein, is made up of electronic neurons that mimic biological neurons through the use of physical processors and/or software.

In an electronic neural network, neurons are arranged in layers, known as an input layer, hidden layer(s), and an output layer. The input layer includes neurons/nodes that take input data, and send it to a series of hidden layers of neurons, in which all neurons from one layer in the hidden layers are interconnected with all neurons in a next layer in the hidden layers. The final layer in the hidden layers then outputs a computational result to the output layer, which is often one or more nodes for holding vector information.

As shown in FIG. 2, DNN 224 is used to determine how close the sense/meanings of a current social media post 201 is to other reference social media posts 202 that uses a same hashtag as the current social media post 201.

That is, DNN 224 is trained to recognize certain posts as having either a same/consistent sense or a different/divergent sense, even though they use the same hashtag.

For example, assume that inputs into DNN 224 are the current social media post 201 (e.g., "Restaurant Name is wonderful! #Name") and one or more reference social media posts 202 (e.g., a prototypical reference social media post such as "Artist Name is an unusual artist. #Name"). In this example, the output sense labels 215 would include a label 217 indicating that these two posts are different in meaning (divergent) and a label 219 indicating that these two posts are similar in meaning (consistent). Although the two sense labels 215 are contradictory, the divergent label 217 has a higher value (due to processing and output from the DNN 224) than the consistent label 219. As such, the DNN 224 recognizes that this current social media post 201 has a different sense than reference social media posts 202 that use a same hashtag (e.g., #Name) as the current social media post 201.

The output of DNN 224 is the result of training DNN 224 with the reference social media posts 202 (and/or similar identified posts) to multiple examples of a training social media posts 204. That is, if a training social media posts 204 is known to have a sense that is divergent from the sense of the reference social media posts 202, then the DNN 244 is trained to output the divergent label 217 with a higher value than the consistent label 219. However, if a training social media post 204 is known to have a sense that is similar to the sense of the reference social media posts 202, then the DNN 224 is trained to output the consistent label 219 with a higher value than the divergent label 217.

In order to train and utilize DNN 224 in accordance with one or more embodiments of the present invention, descriptions of the operations of DNN 224 are described with reference to FIG. 2.

As shown in FIG. 2, the electronic neurons in DNN 224 are arranged in layers, known as the input layer 203, hidden layers 205, and an output layer 207. The input layer 203 includes neurons/nodes that take input data, and send it to a series of hidden layers of neurons (e.g., hidden layers 205), in which neurons from one layer in the hidden layers are interconnected with all neurons in a next layer in the hidden layers 205. The final layer in the hidden layers 205 then outputs a computational result to the output layer 207, which often has multiple nodes, each of which holds vector information. In one or more embodiments of the present invention, each neuron in the output layer 207 is associated with a particular output to identify the sense labels 215, as shown in FIG. 2.

As mentioned above, each node in the depicted DNN 224 represents an electronic neuron, such as the depicted neuron 209. As shown in block 211, each neuron (including neuron 209) includes multiple features, such as: a mathematical function, an output value, a weight, and a bias value.

The mathematical function is a mathematic formula for processing data from one or more upstream neurons. For example, assume that one or more of the neurons depicted in the middle hidden layers 205 send data values to neuron 209. Neuron 209 then processes these data values by executing the mathematical function shown in block 211, in order to create one or more output values, which are then sent to another neuron, such as another neuron within the hidden layers 205 or a neuron in the output layer 207.

In one or more embodiments of the present invention, the mathematical function shown in block 211 is a comparison function. That is, this mathematical function compares the similarity of word vectors between words in the current post and other posts, compares placement of similar words and/or dissimilar words between the current post and the other posts, compares a known meaning of similar and/or dissimilar words between the current post and the other posts, etc. That is, the mathematical function is code that has been written to determine how similar words, phrases, etc. and their meanings are as used in the current post and the other posts.

In one or more embodiments of the present invention, each neuron also has a weight that is specific for that neuron and/or for other connected neurons. Furthermore, the output value(s) are added to bias value(s), which increase or decrease the output value, allowing the DNN 224 to be further "fine-tuned".

For example, assume that neuron 213 is sending the results of its analysis of a piece of data to neuron 209. Neuron 209 has a first weight that defines how important data coming specifically from neuron 213 is. If the data is important, then data coming from neuron 213 is weighted heavily, and/or increased by the bias value, thus causing the mathematical function (s) within neuron 209 to generate a higher output, which will have a heavier impact on neurons in the output layer 207. Similarly, if neuron 213 has been determined to be significant to the operations of neuron 209, then the weight in neuron 213 will be increased, such that neuron 209 receives a higher value for the output of the mathematical function in the neuron 213. Alternatively, the output of neuron 209 can be minimized by decreasing the weight and/or bias used to affect the output of neuron 209. These weights/biases are adjustable for one, some, or all of the neurons in the DNN 224, such that a reliable output will result from output layer 207. Such adjustments are performed manually or automatically.

When manually adjusted, the mathematical function(s), output value(s), weight(s), and/or bias value(s) are adjusted by the user in a repeated manner until the output from output layer 207 matches expectations. For example, assume that the reference social media posts 202 and the training social media post 204 have dissimilar senses/meanings. As such, the mathematical function(s), output value(s), weight(s), and/or bias value(s) shown in block 211 are manually adjusted until the divergent label 217 is ranked and displayed higher than the consistent label 219.

When automatically adjusted, the mathematical functions, output values, weights, and/or biases are adjusted using "back propagation", in which a "gradient descent" method determines how each mathematical function, output value, weight, and/or bias should be adjusted in order to provide an output. That is, the mathematical function(s), output value(s), weight(s), and/or bias value(s) shown in block 211 are recursively adjusted until the sense labels 215 are ranked and displayed in accordance with how closely the training social media post 204 matches the reference social media posts 202.

Besides determining if the sense/meanings of the current social media post and the reference social media posts are consistent or divergent, the training and use of DNN 224 as described above is used in one or more embodiments of the present invention to determine if the sentiment/emotion of the current social media post and the reference social media posts are the same (consistent) or different (divergent).

That is, using the training process described above, DNN 224 is trained to identify sentiments of the current social media post 201 and the reference social media posts 202, and then compares these two sentiments in order to determine if they are divergent or consistent (and to output this determination). In one or more embodiments of the present invention, DNN 224 is trained to search for certain key words that are indicative of certain emotions in the reference social media posts 202, rank/weight these key words, and thus be capable of comparing similar key words from the current social media post 201 in order to determine if the key words, and thus the sentiments they represent, are consistent or divergent between the current social media post 201 and the reference social media posts 202 (that share the same hashtag with the current social media post 201).

In one or more embodiments of the present invention, a profile of the poster of the current social media post 201 and/or the posters of the reference social media posts 202 are used, either by training DNN 224 or by a coarse comparison, to determine how closely the meanings of the compared posts are. That is, if a particular poster has a profile as being a restaurant critic, then #Name will be assumed to be referring to the name of a restaurant. However, if a particular poster has a profile as being an expert in the field of art, then #Name will be assumed to be referring to the name of an artist. As such, posts from different posters who have a similar profile are determined to have a similar sense, while posts from different posters who have different profiles are determined to have a divergent sense.

In one or more embodiments of the present invention, a current geophysical location of the poster of the post is used to determine the sense of that poster's post. For example, if the poster posts "Weather here today is typical. #Typical Weather" in January from an Internet Protocol (IP) address and/or with a global positioning system (GPS) signal that is known to be associated with a computer in Hawaii, while another poster also posts "Weather here today is typical. #TypicalWeather" from an IP address and/or GPS signal that is known to be associated with a computer in Alaska, then the sense/meaning of #Typical Weather will be very different for the two posts.

Using conclusions obtained by one or more of the process (es) described above, one or more embodiments of the present invention then decide whether to alter the present post, to present an alert or some other kind of visual cue to the poster, to alter the hashtag, etc.

In one or more embodiments of the present invention, this decision to alter the post and/or issue an alert is based on how many other posters of posts having a particular sense/meaning are using the same hashtag as the current user and the level of a sentiment associated with the posts. For example, and in one or more embodiments of the present invention, if at least 1,000 existing posts that share a hashtag with a current post have a particular sense and a strongly negative sentiment, or at least 10,000 existing posts that share a hashtag with a current post have that particular sense and any sentiment, but the current post does not match that particular sense in either scenario, then an alert to the poster and/or a modification to the current post (either the text of the current post or the shared hashtag) is performed.

In one or more embodiments of the present invention, the operations described above (i.e., evaluating a current social media post, and altering or issuing an alert about the current social media post) are performed again after some predetermined amount of time has passed (i.e., a time in the future). That is, the original social media post is compared to the latest social media posts, in order to evaluate potential "drift" in hashtag sense and sentiment after a point-in-time when the post was originally created. After this "drift" analysis, the original post is altered and/or an alert is issued to the poster.

In one or embodiments of the present invention, the time in the future for performing these operations is after a fixed amount of time has passed (e.g., hourly or daily).

In one or more embodiments of the present invention, the time in the future for performing these operations is after the post has received a fixed number of views (e.g., every thousand views).

In one or more embodiments of the present invention, the time in the future for performing these operations is after the post has received a fixed number of responses (e.g., every thousand likes and/or replies).

In one or more embodiments of the present invention, the time in the future for performing these operations is after the post has received a fixed number of unfavorable responses (e.g., every thousand replies with negative sentiment).

Figure 3:
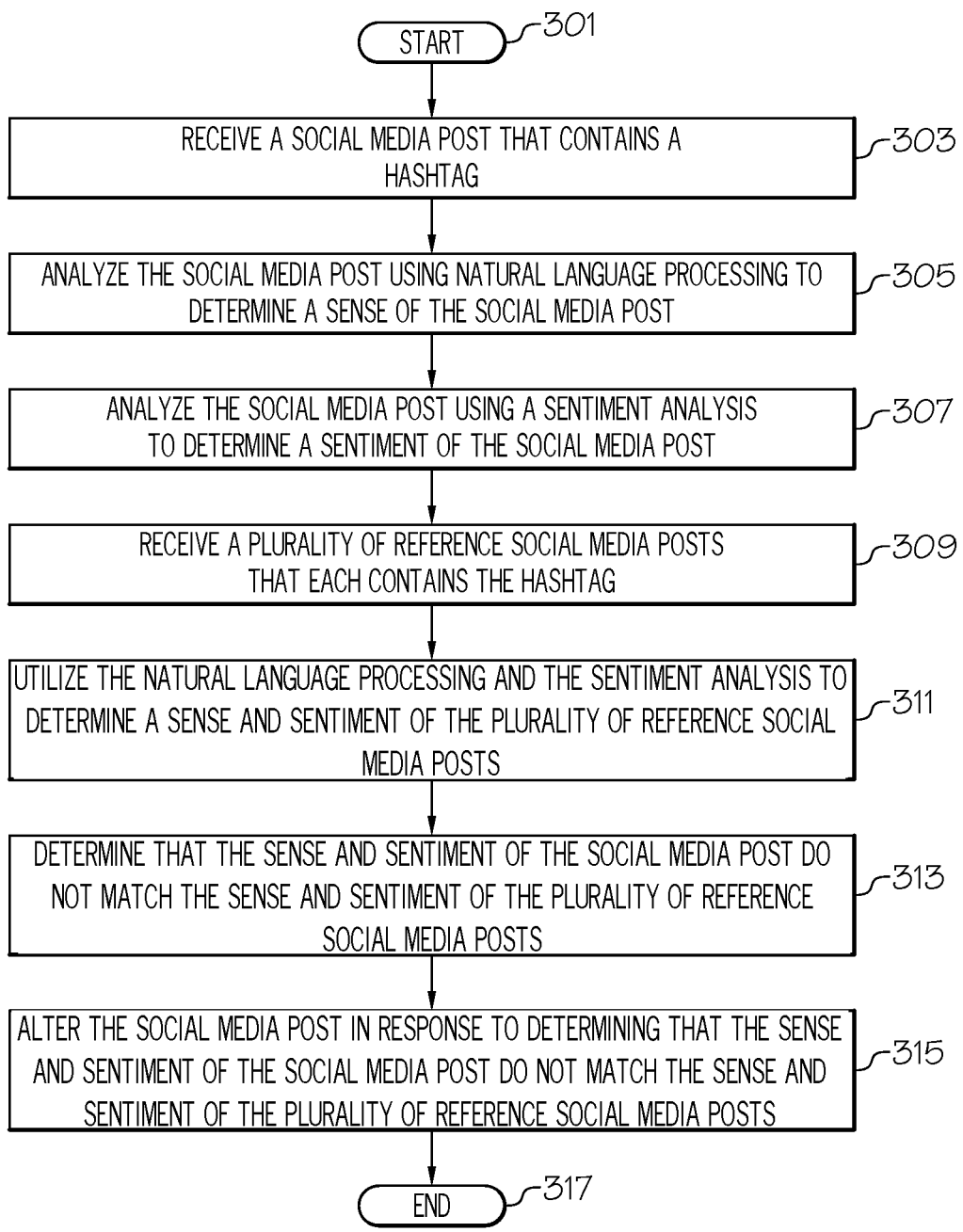
FIG. 3 is a high-level flow chart of one or more steps performed in accordance with one or more embodiments of the present invention.

With reference now to FIG. 3, a high-level flow chart of one or more steps performed in accordance with one or more embodiments of the present invention is presented.

After initiator block 301, a computing device (e.g., computer 102 shown in FIG. 1) receives a social media post, as described in block 303. As described herein, social media post contains a hashtag (e.g., #Name).

As described in block 305, the computing device analyzes the social media post using natural language processing to determine a sense of the social media post. That is, natural language processing identifies the meaning of words/terms/phrases used in the social media post, as well as their relationship with other words/terms/phrases in the social media post, in order to determine the sense (meaning) of the social media post.

As described in block 307, the computing device analyzes the social media post using a sentiment analysis to determine a sentiment of the social media post. Various embodiments of the present invention use one or more types of sentiment analysis.

In one or more embodiments of the present invention, the sentiment analysis simply looks for certain key words to determine the sentiment. For example, words in the post such as "detest" and "abhor" indicate a negative sentiment, while words in the post such as "adore" and "love" indicate a positive sentiment.

In one or more embodiments of the present invention, a more sophisticated sentiment analysis uses the use or absence of all capital letters, bolding, underlining, etc. indicate the intended sentiment of the poster. For example, if the poster uses all capital letters, then the sentiment is likely one of anger.

In one or more embodiments of the present invention, a DNN (e.g., DNN 224 shown in FIG. 2) is trained to function as the computing device and/or to assist the computing device in order to perform the sentiment analysis. That is, just as DNN 224 has been described above for identifying a sense of a current social media post and a sense of other reference social media posts, DNN 224 is trained, in one or more embodiments of the present invention, to recognize the sentiment/emotion of social media posts using a mathematical function that recognizes certain words that are known to associated with certain emotions, the use of certain fonts (e.g., using all capital letters, bolding, underling, etc.) that are associated with certain emotions, etc., and then weighting/biasing the outputs of neurons that detect such sentiments in order to achieve the desired output in the output layer described above.

As described in block 309, the computing device receives a plurality of reference social media posts, where each of the plurality of social media posts contains the hashtag. That is, there is the current social media post, and there are other reference social media posts that have previously been posted (e.g., by other posters). Both the current social media post and the other reference social media posts include a same hashtag (e.g., #Name).

As described in block 311, the computing device utilizes the natural language processing and the sentiment analysis to determine a sense and a sentiment of the plurality of reference social media posts, as described herein.

As described in block 313, the computing device determines that the sense and sentiment of the social media post do not match the sense and sentiment of the plurality of reference social media posts. For example, if the sentiment of the reference social media posts is one of anger, but the sentiment of the current social media post is one of affection, then there is a disconnect between the current social media post and the reference social media posts. Similarly, if the sense of the reference social media posts is about public figures, but the sense of the current social media post is about a restaurant, then there is a disconnect between the current social media post and the reference social media posts.

As described in block 315, the computing device alters the social media post in response to determining that the sense and sentiment of the social media post do not match the sense and sentiment of the plurality of reference social media posts.

In one or more embodiments of the present invention, the computing device does not directly alter the social media post, but rather sends an alert to a poster of the current social media post, alerting that user to the fact that the hashtag used in the current social media post is inconsistent in sense/sentiment with the sense/sentiment of that hashtag when used with other social media posts. In one or more embodiments of the present invention, the poster then modifies the hashtag and/or post. In one or more embodiments of the present invention, the poster decides to keep the post and/or hashtag in its original version without any changes thereto, and posts the social media post as originally drafted by that poster.

In one or more embodiments of the present invention, altering the social media post is performed by transmitting, from the computing device to a posting entity of the social media post, an instruction that causes the posting entity to cancel the social media post. That is, the altering of the current social media post is to cancel it, such that it is not sent to the post receiving entity(ies) 154 shown in FIG. 1.

In one or more embodiments of the present invention, altering the social media post is performed by transmitting, from the computing device to a posting entity of the social media post, an instruction that causes the posting entity to remove the hashtag from the social media post. That is, the social media post remains the same, but the incongruous use of the hashtag (as compared to the use of the hashtag by the reference social media posts) causes the system to remove the hashtag.

In one or more embodiments of the present invention, altering the social media post is performed by transmitting, from the computing device to a posting entity of the social media post, an instruction that causes the posting entity to amend the hashtag in the social media post. That is, the social media post remains the same, except that the hashtag is changed to use a hashtag other than the incongruous hashtag as used by the reference social media posts. In various embodiments of the present invention, the new hashtag is either selected by the poster manually, or else is selected automatically by the computer system. For example, assume that the natural language processing of the current social media posts determines that the current social media post giving a positive restaurant review. The system auto-generates a hashtag #RestaurantReview, and then goes through the processes described above to ensure that the hashtag #RestaurantReview is not being frequently used to tag some other topic and/or to reflect some other (divergent) sense and/or sentiment.

In one or more embodiments of the present invention, altering the social media post is performed by transmitting, from the computing device to a posting entity of the social media post, an instruction that causes the posting entity to amend text, other than the hashtag, in the social media post. That is, in one or more embodiments of the present invention, the text (e.g., "Name is wonderful!") in the social media post "Name is wonderful! #Name" is changed (e.g., to "Name serves food that is delicious!"), while the hashtag (#Name) in the post (now posted as "Name serves food that is delicious! #Name") remains the same. Thus, even though social media searchers will perhaps not find what they are looking for, since #Name is expected to lead them to a topic other than a restaurant review, the text of the newly amended post now makes it clear that the sense/meaning of the post is about a restaurant review.

The flow chart shown in FIG. 3 ends at terminator block 317.

In one or more embodiments of the present invention, the computing device transmits, to a posting entity of the social media post (e.g., posting entity 152 shown in FIG. 1), an alert that notifies the posting entity that the sentiment of the social media post does not match the sentiment of the plurality of reference social media posts. This allows the posting entity (or a user of the posting entity, if posting entity 152 is a computer) to change the hashtag.

In one or more embodiments of the present invention, the computing device utilizes a cluster analysis to further determine the sentiment of the plurality of reference social media posts, as described above. That is, a cluster analysis clusters sets of reference social media posts together according to their meaning (sense), in order to determine what emotion (sentiment) is intended to be evoked by posts within a cluster.

In one or more embodiments of the present invention, a deep neural network is architected/trained to determine that the sentiment of the social media post does not match the sentiment of the plurality of reference social media posts, as described in FIG. 2.

In one or more embodiments of the present invention, a deep neural network is architected/trained to determine that a sentiment of the hashtag is divergent from the sentiment of the current social media post. For example, consider the deep neural network (DNN) 424 shown in FIG. 4. DNN 424 has an input layer 403, hidden layers 405, an output layer 407, a neuron 413, a neuron 409, and a block 411 that are analogous, respectively, to the input layer 203, hidden layers 205, output layer 207, neuron 213, neuron 209, and block 211 shown in FIG. 2 for DNN 224.

Using the training processes described above for DNN 224, DNN 424 is trained to receive a particular hashtag 402 and the current social media post 201 (from FIG. 2) as inputs.

Figure 4:
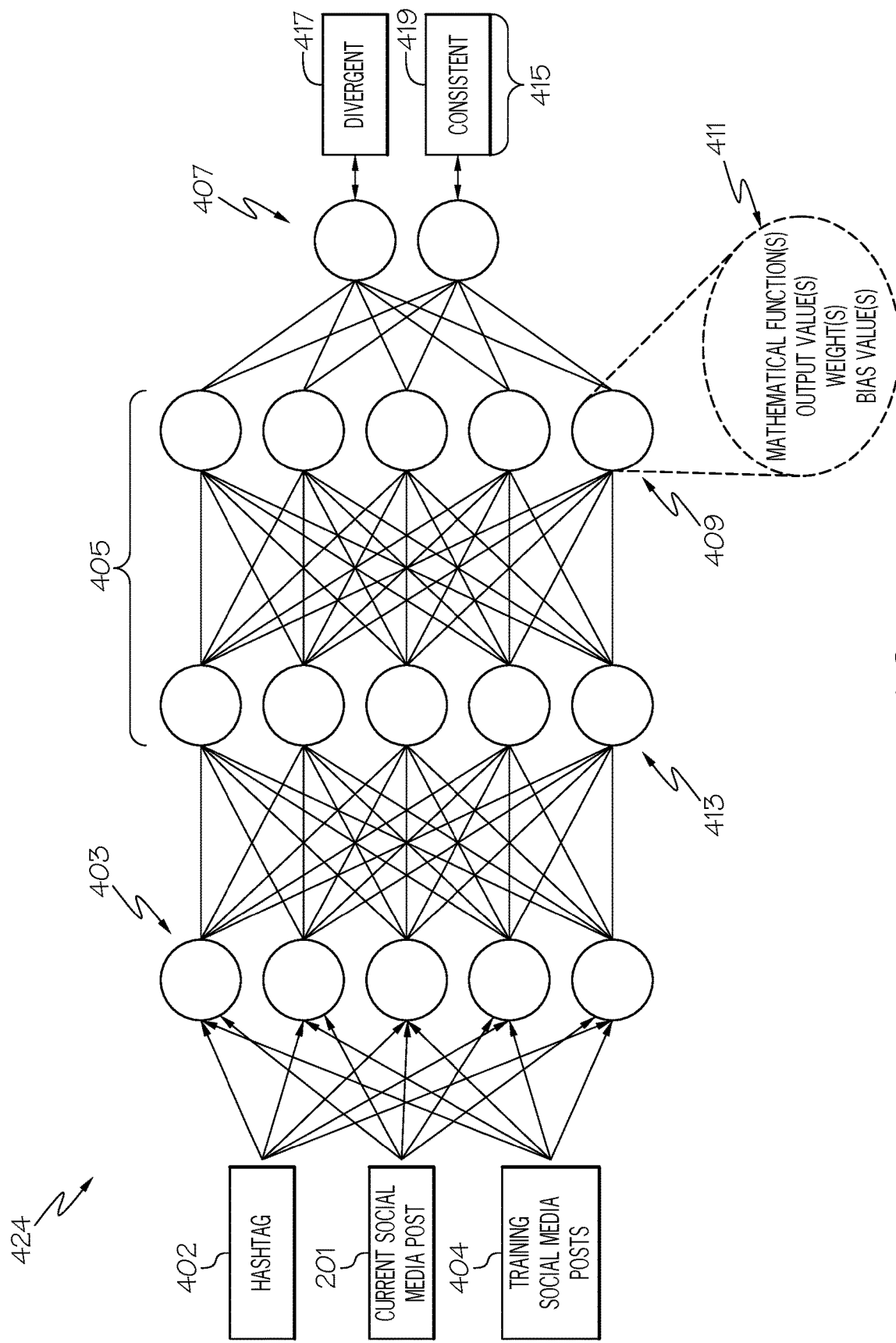
FIG. 4 depicts an exemplary deep neural network as used in one or more embodiments of the present invention to determine whether a hashtag is consistent with a sense of a current social media post.

DNN 424 has been trained by training social media posts 404 to recognize whether hashtag 402 is consistent with certain media posts. That is, DNN 424 has been trained to associate hashtag 402 with a certain type of social media post (e.g., the prototypical post discussed above) found in the training social media posts 404. For example, if hashtag 402 is #FoodReview, then by adjusting the values in block 411 for one or more of the neurons within DNN 424, DNN 424 is trained to associate the hashtag #FoodReview with posts about restaurant reviews from the training social media posts 404, in order to display and rank the output hashtag labels 415. That is, if the hashtag 402 is appropriate for sentiment of the training social media posts 404, then the hashtag label consistent 419 is ranked and displayed above the hashtag label divergent 417 in a trained version of DNN 424. Alternatively, and as shown in FIG. 4, if the hashtag 402 is inappropriate for sentiment of the training social media posts 404, then the hashtag label divergent 417 is ranked and displayed above the hashtag label consistent 419 in a trained version of DNN 424.

Once the DNN 424 has been trained to determine whether hashtag 402 is divergent from or consistent with a particular type of social media post, DNN 424 then determines whether hashtag is divergent from or consistent with the current social media post 201, based on the current social media post 201 being determined by DNN 424 as similar to a particular type of social media post from the training social media posts 404.

That is, the DNN 224 shown in FIG. 2 is trained to recognize whether the current social media post 201 has a same sense and/or sentiment as one or more of the reference social media posts 202 that use a same hashtag as the current social media post 201. DNN 424, which in one or more embodiments of the present invention is a same DNN as DNN 224, has been trained to rank a hashtag 402 as having a sentiment that is divergent from or consistent with the sense of the current social media post 201.

For example, if hashtag 402 (e.g., #RestaurantReview) is for a restaurant review, and the current social media post 201 is also about a restaurant review (as determined by trained neurons within the DNN 424), then hashtag 402 is deemed to be consistent with the current social media post 201, and the consistent label 419 is ranked and displayed higher than the divergent label 417. However, if hashtag 402 is about a restaurant review (e.g., #RestaurantReview), but the current social media post 201 is not about a restaurant review (as determined by trained neurons within the DNN 424), then hashtag 402 is deemed to be divergent from the current social media post 201, and the divergent label 417 is ranked and displayed higher than the consistent label 419, as shown in FIG. 4. This determination allows the system to decide whether or not to change or delete the hashtag 402 and/or the text content of the current social media post 201, as described herein.

In one or more embodiments of the present invention, a deep neural network is architected/trained to determine that the sense of the social media post does not match the sense of the plurality of reference social media posts that have the hashtag contained in the social media post, using the process described in FIG. 4. That is, even though the reference social media posts have a particular sense/meaning, the hashtag that they are using has a difference sense/meaning. As such, their use is deemed to be ironic, incorrect, etc., and a poster of the current social media post is so notified of this ironic/incorrect use of the hashtag by the other social media posts.

In one or more embodiments of the present invention, a deep neural network is architected/trained to determine that the sense of the hashtag is divergent from the sense of the plurality of reference social media posts that have the hashtag contained in the social media post, using the process described in FIG. 4. That is, even though the reference social media posts have a particular sense/meaning, the hashtag that they are using has an alternate/unconventional meaning that is difference from the traditional sense/meaning. As such, their use is deemed to be divergent, and a poster of the current social media post is so notified of this alternate/unconventional use of the hashtag by the other social media posts.

In one or more embodiments of the present invention, the computing device receives a posting profile of a posting person who is posting the social media post; analyzes the posting profile using the natural language processing and the sentiment analysis to determine a sentiment of the posting person; and further alters the social media post in order to comport with the sentiment of the posting person as determined by analyzing the posting profile. That is, in one or more embodiments, rather than using the natural language processing and the sentiment analysis just to evaluate the social media post, the poster's profile is also evaluated using the natural language processing and the sentiment analysis, such that the general sentiment (positive, negative, etc.) of the poster is determined. If what that poster posted (the text and/or the hashtag associated with that text) is incongruous with the sentiment of the poster according to the poster's profile (e.g., profile of the poster states that the poster strives to always have a positive attitude), then the system changes the post to comport with the sentiment of the poster and/or alerts the poster of inconsistent messaging.

In one or more embodiments of the present invention, the computing device receives a geophysical location of a posting entity that is posting the social media post; and further alters the social media post based on the geophysical location of the posting entity. That is, the term "normal weather" means different things in Hawaii and Alaska in January. As such, the post is changed according. For example, the text for a post from Hawaii is changed from "normal weather" to "warm weather", and/or the hashtag for the post is changed from #NormalTemperatures to #BalmyTemperatures.

In one or more embodiments of the present invention, the computing device determines that a quantity of the plurality of reference social media posts, which have the sense that does not match the sense of the social media post, exceeds a predetermined value. In response to determining that the quantity of the plurality of reference social media posts, which have the sense that does not match the sense of the social media post, exceeds the predetermined value, the computing device further alters the social media post. For example, assume that 90% of the reference social media posts are about (sense) fishing, the current social media post is about movies, and yet they both use the same hashtag #Trout_Fishing. As such, the reference social media posts are deemed to be the conventional users of that particular hashtag if their numbers are large enough. If so, then the text and/or the hashtag in the current post is automatically altered, in order to avoid being confused with the other posts that use the hashtag found in the original version of the current post. In one or more embodiment of the present invention, the post owner receives an alert when the hashtag with the social media post is divergence in terms of sense and sentiment of the post content or usage of the same hashtag in other similar posts, which lets the post owner either withdraw the post or modify it as per the suggested sense/sentiment of the hashtag or to alter the post content from the post in order to maintain parity.

In one or more embodiments of the present invention, the computing device determines that a quantity of the plurality of reference social media posts, which have the sentiment that does not match the sentiment of the social media post, exceeds a predetermined value. In response to determining that the quantity of the plurality of reference social media posts, which have the sentiment that does not match the sentiment of the social media post, exceeds the predetermined value, the computing device further alters the social media post. For example, assume that 90% of the reference social media posts are angry (sentiment), the current social media post is happy (sentiment), and yet they both use the same hashtag. As such, the reference social media posts are deemed to be the conventional users of that particular hashtag that expresses the sentiment of being angry if their numbers are large enough. If so, then the text and/or the hashtag in the current post is automatically altered, in order to avoid being confused with the other posts that use the hashtag found in the original version of the current post. In one or more embodiments of the present invention, rather than automatically altering the hashtag, the computing device sends an alert to the poster of the social media post, recommending that the hashtag be altered in order to differentiate the post from other postings that have a different sentiment.

In one or more embodiments of the present invention, the computing device determines that a level of divergence between the sentiment of the social media post and the sentiment of the reference social media posts exceeds a predetermined value. In response to determining that the level of divergence between the sentiment of the social media post and the sentiment of the reference social media posts exceeds a predetermined value, the computing device further alters the social media post. That is, if the current post and reference posts have similar, but not exact, sentiments (e.g., the current post displays a happy sentiment, while the reference posts display a very happy sentiment), then the hashtag found in the original version of the current post will be left as is. However, if the current post has a sentiment of happy, but the reference posts have sentiments of very angry, then the hashtag in the current post is changed, such that social media users are not drawn to a post that has an unexpected happy sentiment. In one or more embodiments of the present invention, rather than automatically altering the hashtag, the computing device sends an alert to the poster of the social media post, recommending that the hashtag be altered in order to differentiate the post from other postings that have a different sense and/or sentiment.

In one or more embodiments of the present invention, the computing device determines that a quantity of the plurality of reference social media posts that contain the hashtag has increased beyond a predetermined level. In response to determining that the quantity of the plurality of reference social media posts that contain the hashtag has increased beyond the predetermined level, the computing device further alters the social media post. That is, once the hashtag has become the dominant hashtag for conveying a certain sense/sentiment, it is deemed to be inappropriate for use with a post that has a different sense/sentiment, and thus the hashtag in that post is changed.

In one or more embodiments of the present invention, the computing device determines that a quantity of negative responses to the social media post is greater than a predetermined level. In response to determining that the quantity of negative responses to the social media post is greater than a predetermined level, the computing device further alters the social media post. That is, if the current social media post receives overwhelming negative feedback, then there is perhaps a problem with the hashtag. As such, the system will alter the hashtag, such that hashtag users are not led to a post having a sense/sentiment that is not what they are looking for. In one or more embodiments of the present invention, rather than automatically altering the hashtag, the computing device sends an alert to the poster of the social media post, recommending that the hashtag be altered in order to differentiate the post from other postings that have a different sense and/or sentiment.

In one or more embodiments of the present invention, if the sense and sentiment of the current post content and/or hashtag does not match the sense and sentiment of the other (reference) postings, then the current post content is prevented from being posted on the social media platform until 1) the posting entity overrides the change/recommendation from the computing device, and decides to post the content as originally drafted; or 2) the posting entity amends the post content and/or the hashtag. That is, in one or more embodiments of the present invention, any change to the posting must be made before it is posted on the social media platform, in order to avoid the problems discussed herein if a posting has a hashtag that does not convey a sense/sentiment intended by the content poster.

In one or more embodiments, the present invention is implemented using cloud computing. Nonetheless, it is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model includes at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but still is able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. In one or more embodiments, it is managed by the organization or a third party and/or exists on-premises or off-premises.

Community cloud: the cloud infrastructure is shared by several organizations and supports a specific community that has shared concerns (e.g., mission, security requirements, policy, and compliance considerations). In one or more embodiments, it is managed by the organizations or a third party and/or exists on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
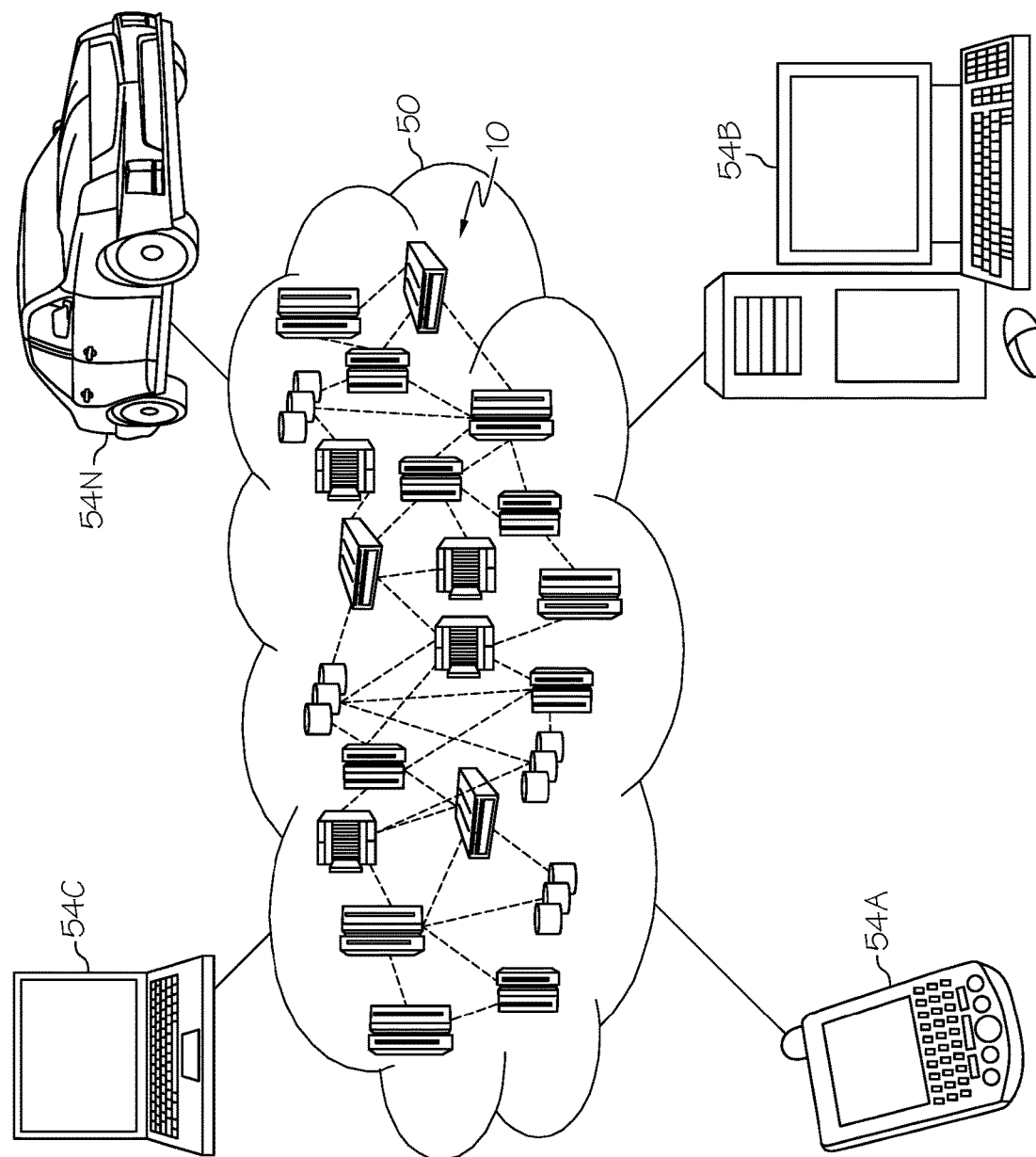
FIG. 5 depicts a cloud computing environment according to one or more embodiments of the present invention.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N communicate with one another. Furthermore, nodes 10 communicate with one another. In one embodiment, these nodes are grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 5 are intended to be illustrative only and that computing nodes 10 and cloud computing environment 50 can communicate with any type of computerized device over any type of network and/or network addressable connection (e.g., using a web browser).

Figure 6:
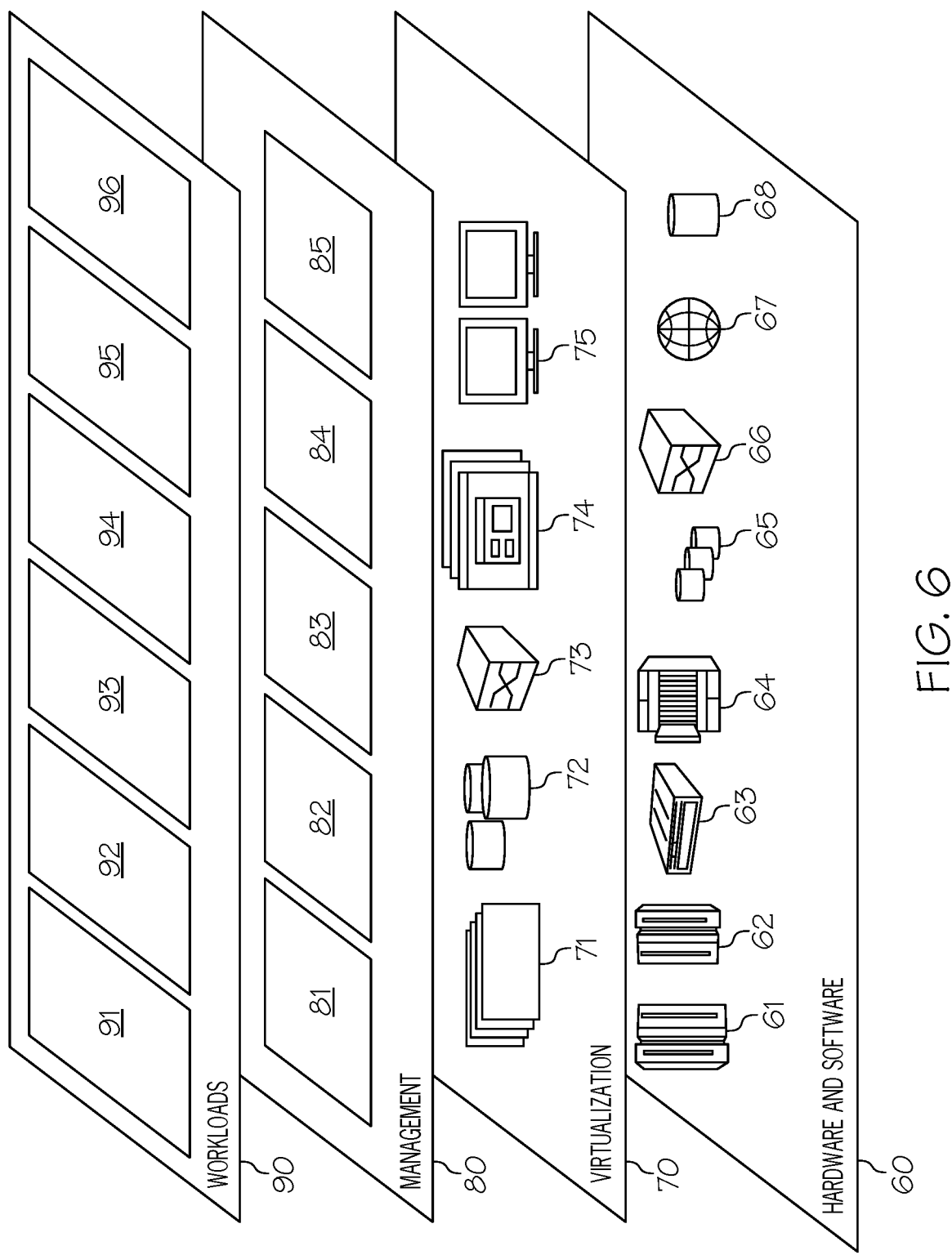
FIG. 6 depicts abstraction model layers of a cloud computer environment according to one or more embodiments of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities that are provided in one or more embodiments: virtual servers 71; virtual storage 72; virtual networks 73, including virtual private networks; virtual applications and operating systems 74; and virtual clients 75.

In one example, management layer 80 provides the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment are utilized in one or more embodiments. Examples of workloads and functions which are provided from this layer include: mapping and navigation 91; software development and lifecycle management 92; virtual classroom education delivery 93; data analytics processing 94; transaction processing 95; and hashtag management processing 96, which performs one or more of the features of the present invention described herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

In one or more embodiments of the present invention, any methods described in the present disclosure are implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, in one or more embodiments of the present invention any software-implemented method described herein is emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method comprising:
   receiving, by a computing device, a social media post, wherein the social media post contains a hashtag;
   analyzing, by the computing device, the social media post using natural language processing to determine a sense of the social media post;
   analyzing, by the computing device, the social media post using a sentiment analysis to determine a sentiment of the social media post;
   receiving, by the computing device, a plurality of reference social media posts, wherein each of the plurality of social media posts contains the hashtag;
   utilizing, by the computing device, the natural language processing and the sentiment analysis to determine a sense and a sentiment of the plurality of reference social media posts;
   determining, by the computing device, that the sense and sentiment of the social media post do not match the sense and sentiment of the plurality of reference social media posts;
   altering, by the computing device, the social media post in response to determining that the sense and sentiment of the social media post do not match the sense and sentiment of the plurality of reference social media posts;
   receiving, by the computing device, a posting profile of a posting person who is posting the social media post;
   analyzing, by the computing device, the posting profile using the natural language processing and the sentiment analysis to determine a sentiment of the posting person; and
   further altering, by the computing device, the social media post in order to comport with the sentiment of the posting person as determined by analyzing the posting profile.

2. The method of claim 1, further comprising:
   transmitting, from the computing device to a posting entity of the social media post, an alert that notifies the posting entity that the sentiment of the social media post does not match the sentiment of the plurality of reference social media posts.

3. The method of claim 1, wherein the altering of the social media post is performed by transmitting, from the computing device to a posting entity of the social media post, an instruction that causes the posting entity to cancel the social media post.

4. The method of claim 1, wherein the altering of the social media post is performed by transmitting, from the computing device to a posting entity of the social media post, an instruction that causes the posting entity to remove the hashtag from the social media post.

5. The method of claim 1, wherein the altering of the social media post is performed by transmitting, from the computing device to a posting entity of the social media post, an instruction that causes the posting entity to amend the hashtag in the social media post.

6. The method of claim 1, wherein the altering of the social media post is performed by transmitting, from the computing device to a posting entity of the social media post, an instruction that causes the posting entity to amend text, other than the hashtag, in the social media post.

7. The method of claim 1, further comprising:
   utilizing, by the computing device, a cluster analysis to further determine the sentiment of the plurality of reference social media posts.

8. The method of claim 1, further comprising:
   architecting and training a deep neural network to determine that the sentiment of the social media post does not match the sentiment of the plurality of reference social media posts, wherein the deep neural network is trained by using the sense and sentiment of the social media post and the sense and sentiment of the plurality of reference social media posts as training inputs.

9. The method of claim 1, further comprising:
   architecting and training a deep neural network to determine that a sentiment of the hashtag is divergent from the sentiment of the social media post wherein the deep neural network is trained by using the sense and sentiment of the social media post and the sense and sentiment of the plurality of reference social media posts as training inputs.

10. The method of claim 1, further comprising:
    architecting and training a deep neural network to determine that the sense of the hashtag does not match the sense of the plurality of reference social media posts that have the hashtag contained in the social media post, wherein the deep neural network is trained by using the sense and sentiment of the social media post and the sense and sentiment of the plurality of reference social media posts as training inputs.

11. The method of claim 1, further comprising:
    architecting and training a deep neural network to determine that the sense of the hashtag is divergent from the sense of the plurality of reference social media posts that have the hashtag contained in the social media post, wherein the deep neural network is trained by using the sense and sentiment of the social media post and the sense and sentiment of the plurality of reference social media posts as training inputs.

12. The method of claim 1, further comprising:
    receiving, by the computing device, the posting profile of the posting person who is posting the social media post;
    analyzing, by the computing device, the posting profile using the natural language processing and the sentiment analysis to determine an occupation of the posting person; and
    further altering, by the computing device, the social media post in order to comport with the occupation of the posting person as determined by analyzing the posting profile.

13. The method of claim 1, further comprising:
    receiving, by the computing device, a geophysical location of a posting entity that is posting the social media post; and further altering, by the computing device, the social media post based on the geophysical location of the posting entity.

14. The method of claim 1, further comprising:
determining, by the computing device, that a quantity of the plurality of reference social media posts, which have the sense that does not match the sense of the social media post, exceeds a predetermined value; and
in response to determining that the quantity of the plurality of reference social media posts, which have the sense that does not match the sense of the social media post, exceeds the predetermined value, further altering, by the computing device, the social media post.

15. The method of claim 1, further comprising:
determining, by the computing device, that a level of divergence between the sentiment of the social media post and the sentiment of the reference social media posts exceeds a predetermined value; and
in response to determining that the level of divergence between the sentiment of the social media post and the sentiment of the reference social media posts exceeds a predetermined value, further altering, by the computing device, the social media post.

16. The method of claim 1, further comprising:
determining, by the computing device, that a quantity of the plurality of reference social media posts that contain the hashtag has increased beyond a predetermined level; and
in response to determining that the quantity of the plurality of reference social media posts that contain the hashtag has increased beyond the predetermined level, further altering, by the computing device, the social media post.

17. The method of claim 1, further comprising:
determining, by the computing device, that a quantity of negative responses to the social media post is greater than a predetermined level; and
in response to determining that the quantity of negative responses to the social media post is greater than a predetermined level, further altering, by the computing device, the social media post.

18. A computer program product comprising a computer readable storage medium having program code embodied therewith, wherein the computer readable storage medium is not a transitory signal per se, and wherein the program code is readable and executable by a processor to perform a method comprising:
receiving a social media post, wherein the social media post contains a hashtag;
analyzing the social media post using natural language processing to determine a sense of the social media post;
analyzing the social media post using a sentiment analysis to determine a sentiment of the social media post;
receiving a plurality of reference social media posts, wherein each of the plurality of social media posts contains the hashtag;
utilizing the natural language processing and the sentiment analysis to determine a sense and a sentiment of the plurality of reference social media posts;
determining that the sense and sentiment of the social media post do not match the sense and sentiment of the plurality of reference social media posts;
altering the social media post in response to determining that the sense and sentiment of the social media post do not match the sense and sentiment of the plurality of reference social media posts;
determining that a level of divergence between the sentiment of the social media post and the sentiment of the reference social media posts exceeds a predetermined value; and
in response to determining that the level of divergence between the sentiment of the social media post and the sentiment of the reference social media posts exceeds a predetermined value, further altering the social media post.

19. The computer program product of claim 18, wherein the program code is provided as a service in a cloud environment.

20. A computer system comprising one or more processors, one or more computer readable memories, and one or more computer readable non-transitory storage mediums, and program instructions stored on at least one of the one or more computer readable non-transitory storage mediums for execution by at least one of the one or more processors via at least one of the one or more computer readable memories, the stored program instructions executed to perform a method comprising:
receiving a social media post, wherein the social media post contains a hashtag;
analyzing the social media post using natural language processing to determine a sense of the social media post;
analyzing the social media post using a sentiment analysis to determine a sentiment of the social media post;
receiving a plurality of reference social media posts, wherein each of the plurality of social media posts contains the hashtag;
utilizing the natural language processing and the sentiment analysis to determine a sense and a sentiment of the plurality of reference social media posts;
determining that the sense and sentiment of the social media post do not match the sense and sentiment of the plurality of reference social media posts;
altering the social media post in response to determining that the sense and sentiment of the social media post do not match the sense and sentiment of the plurality of reference social media posts;
determining that a quantity of the plurality of reference social media posts that contain the hashtag has increased beyond a predetermined level; and
in response to determining that the quantity of the plurality of reference social media posts that contain the hashtag has increased beyond the predetermined level, further altering the social media post.

\* \* \* \* \*